(12) United States Patent
Yoshida et al.

(10) Patent No.: US 8,610,328 B2
(45) Date of Patent: Dec. 17, 2013

(54) ROTARY ELECTRIC MACHINE

(75) Inventors: Shinichiro Yoshida, Chiyoda-ku (JP); Masaya Inoue, Chiyoda-ku (JP); Shogo Okamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 13/246,566

(22) Filed: Sep. 27, 2011

(65) Prior Publication Data

US 2012/0299410 A1 Nov. 29, 2012

(30) Foreign Application Priority Data

May 23, 2011 (JP) ................................. 2011-114631

(51) Int. Cl.
*H02K 1/18* (2006.01)
*H02K 15/10* (2006.01)
*H02K 3/34* (2006.01)

(52) U.S. Cl.
USPC .............. 310/215; 310/71; 310/214; 310/194

(58) Field of Classification Search
USPC ..................... 310/214–215, 71, 194
See application file for complete search history.

(56) References Cited

U.S. PATENT DOCUMENTS

| 8,269,387 B2 * | 9/2012 | Endo et al. ....................... 310/71 |
| 2010/0194214 A1 * | 8/2010 | Takahashi et al. ............... 310/43 |
| 2010/0275436 A1 * | 11/2010 | Kiyono et al. .................. 29/596 |

FOREIGN PATENT DOCUMENTS

| JP | 2002-291186 | 4/2002 | |
| JP | 2003-061286 A | 2/2003 | |
| JP | 2003061286 A | * 2/2003 | ............... H02K 3/34 |
| JP | 2008-312326 | 12/2008 | |
| WO | WO 2009/051161 | * 4/2009 | ............. H02K 11/00 |

OTHER PUBLICATIONS

JP 2003061286 A machine translation Dec. 28, 2012.*
JP 2003061286 A machine translation Jul. 30, 2013.*
Japanese Office Action dated Apr. 9, 2013 in corresponding Japanese Application No. 2011-114631.

* cited by examiner

*Primary Examiner* — Tran Nguyen
*Assistant Examiner* — Leda Pham
(74) *Attorney, Agent, or Firm* — Sughrue Mion, PLLC (57) ABSTRACT

The concentrated winding coil is mounted onto a tooth such that a coil end portion is housed inside a concave space that is formed by the trunk portion and first and second guide portions at two axial ends of the tooth. Third cover portions of an insulating sheet that is disposed on two circumferential sides of the tooth are folded over so as to overlap with each other and extend so as to cover the coil end portion of the concentrated winding coil, and a second leader line that projects outward from a radially inner end portion of the concentrated winding coil is bent and led radially outward parallel to the coil end portion that is covered by the third cover portions.

3 Claims, 6 Drawing Sheets

ROTARY ELECTRIC MACHINE

BACKGROUND OF THE INVENTION

1. Field of the Invention

The present invention relates to a rotary electric machine that is used in an automotive electric motor, etc., that is mounted to an automobile, for example, and particularly relates to an insulating construction for a concentrated winding that is wound edgewise onto teeth of a stator.

2. Description of the Related Art

Conventional stators in which concentrated windings are applied to pole tooth portions of a stator core include insulating sheets that axially cover concave slot portions that are formed on two sides of the pole tooth portions, and straight portions and coil end portions of winding bodies are insulated by the insulating sheets (see Patent Literature 1, for example).

Patent Literature 1: Japanese Patent Laid-Open No. 2003-61286 (Gazette)

In conventional stators, the straight portions and the coil end portions of the winding bodies are covered and insulated by the insulating sheets, but no mention is made of insulating leader lines that are led out from winding start end portions and winding finish end portions of the winding bodies.

In winding bodies that are wound into concentrated windings on the pole tooth portions, because the electric potential difference between the winding start end portions and the winding finish end portions of the winding bodies is increased, it is necessary to ensure sufficient insulating distance between the leader lines that are led out from the winding start end portions and the winding finish end portions of the winding bodies. If a conductor wire that has a circular cross section is wound onto a pole tooth portion in multiple rows in multiple layers from radially outside, for example, the leader line at the winding start is led radially outward from the radially outermost position of the innermost layer of the winding body (the winding start end portion), and the leader line at the winding finish is led radially outward over a coil end portion from the radially innermost position of the outermost layer of the winding body (the winding finish end portion). Thus, an insulating distance that corresponds to the layer thickness of the coil end portion is ensured between the two leader lines.

However, if a conductor wire that has a rectangular cross section is wound onto a pole tooth portion in multiple rows in a single layer in an edgewise winding, the leader line at the winding start is led out from the radially outermost position of the winding body (the winding start end portion), and the leader line at the winding finish is led radially outward over a coil end portion from the radially innermost position of the winding body (the winding finish end portion). The insulating distance between the two leader lines is then a distance between the leader line at the winding finish and a row that is positioned at the outermost radius of the winding body. Thus, in order to ensure sufficient insulating distance between the two leader lines, it is necessary to increase the distance between the leader line that is led out from the winding finish end portion and the coil end portion, and one problem has been that axial length of the stator is increased, and reductions in size cannot be achieved.

SUMMARY OF THE INVENTION

The present invention aims to solve the above problems and an object of the present invention is to provide a rotary electric machine that suppresses axial length increases in a stator and ensures sufficient electrical insulation between leader lines that are led out from a radially outer end portion and a radially inner end portion in a concentrated winding coil that is wound into an edgewise winding to enable reductions in size to be achieved.

In order to achieve the above object, according to one aspect of the present invention, there is provided a rotary electric machine including: a rotor; a stator including: an annular stator core; and concentrated winding coils that are configured by winding conductor wires that have a rectangular cross section into edgewise windings on respective teeth of the stator core, the stator being disposed so as to surround the rotor; bobbins including: a trunk portion; and a pair of guide portions that are disposed so as to protrude from two longitudinal ends of an upper surface of the trunk portion, the bobbins being disposed such that longitudinal directions of the trunk portions are oriented in a radial direction of the teeth, and so as to place bottom surfaces of the trunk portions alongside two axial end surfaces of the teeth; an insulating sheet including: slot insulating portions that are disposed on first and second circumferential sides of each of the teeth of the stator core, and that are interposed between inner wall surfaces of slots of the stator core and straight portions of the concentrated winding coils to insulate between the stator core and the straight portions; and interphase insulating portions that are disposed on first and second circumferential sides of each of the teeth of the stator core, and that cover the straight portions to insulate between the straight portions in adjacent concentrated winding coils. The concentrated winding coils are mounted onto each of the teeth such that a coil end portion is housed inside a concave space that is formed by the trunk portion and the pair of guide portions at two axial ends of the teeth, a portion of the insulating sheet extends so as to cover the coil end portion, a first leader line that projects outward from a radially outer end portion of the concentrated winding coil is bent and led radially outward, and a second leader line that projects outward from a radially inner end portion of the concentrated winding coil is bent and led radially outward parallel to the coil end portion that is covered by the portion of the insulating sheet.

According to the present invention, because a portion of an insulating sheet extends so as to cover a coil end portion, and a conductor wire that projects outward from a radially inner end portion of a concentrated winding coil is bent, and is led radially outward parallel to the coil end portion that is covered by the portion of the insulating sheet, sufficient electrical insulation is ensured between the second leader line that projects outward from the radially inner end portion of the concentrated winding coil and a radially outer end portion. Thus, it is not necessary to separate the second leader line that projects outward from the radially inner end portion of the concentrated winding coil inordinately from the coil end portion of the concentrated winding coil to be led radially outward parallel to the coil end portion, enabling axial length increases in the stator to be suppressed, thereby enabling reductions in the size of the automotive electric motor.

DETAILED DESCRIPTION OF THE PREFERRED EMBODIMENTS

Preferred embodiments of a rotary electric machine according to the present invention will now be explained using the drawings.

Embodiment 1

Figure 1:
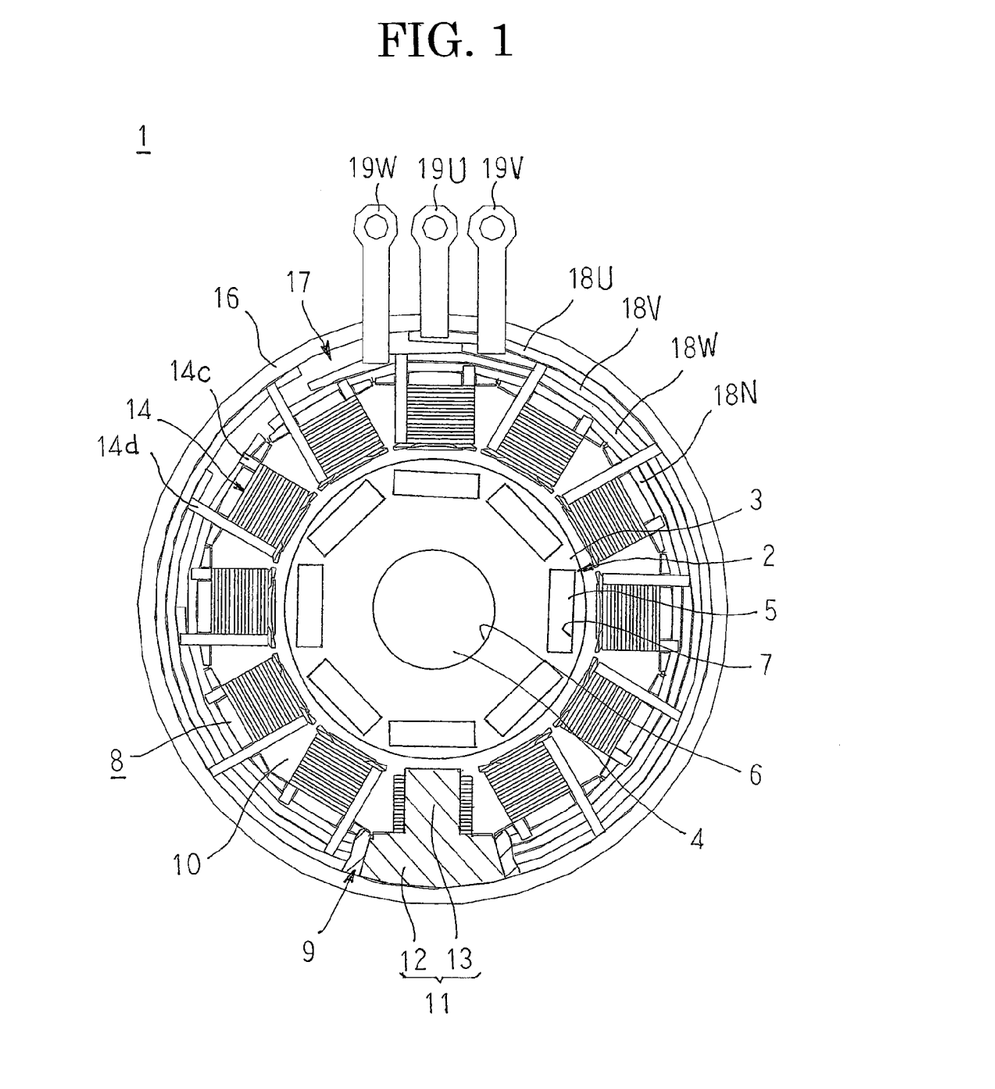
FIG. 1 is a partially cut away end elevation that shows an automotive electric motor according to Embodiment 1 of the present invention.
Figure 2:
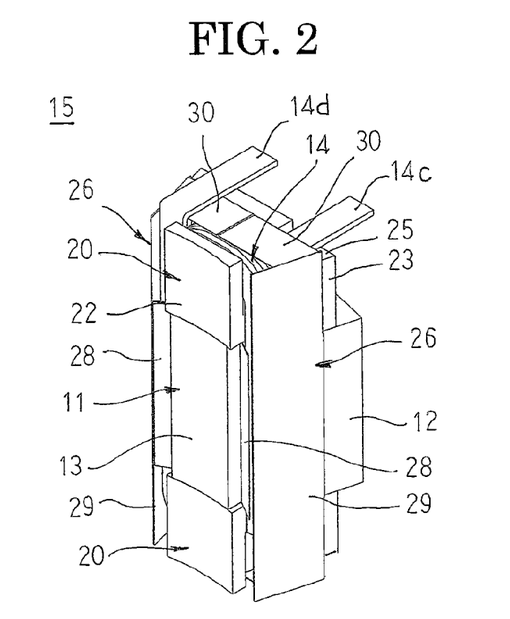
FIG. 2 is a perspective that shows a coil assembly in the automotive electric motor according to Embodiment 1 of the present invention.
Figure 3:
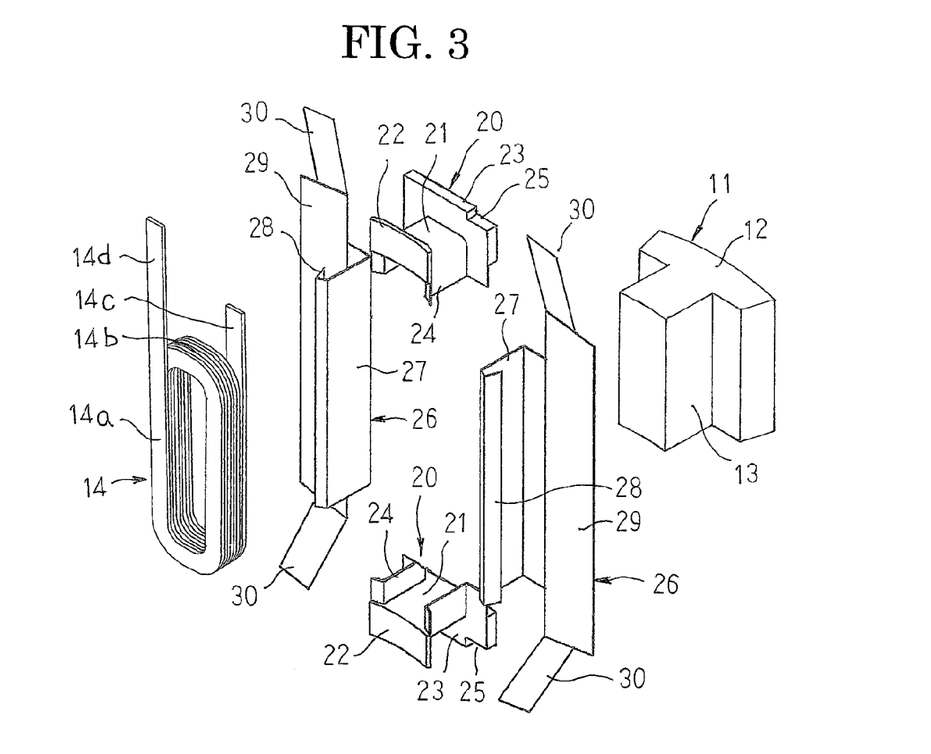
FIG. 3 is an exploded perspective that explains a configuration of the coil assembly in the automotive electric motor according to Embodiment 1 of the present invention.
Figure 4A:
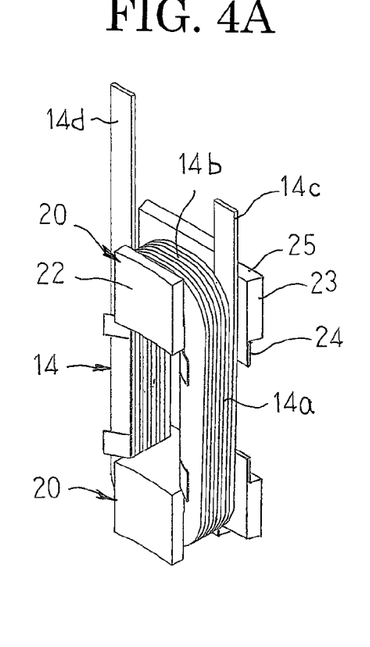
FIGS. 4A through 4C are process perspectives that explain an assembly method for the coil assembly in the automotive electric motor according to Embodiment 1 of the present invention.
Figure 4B:
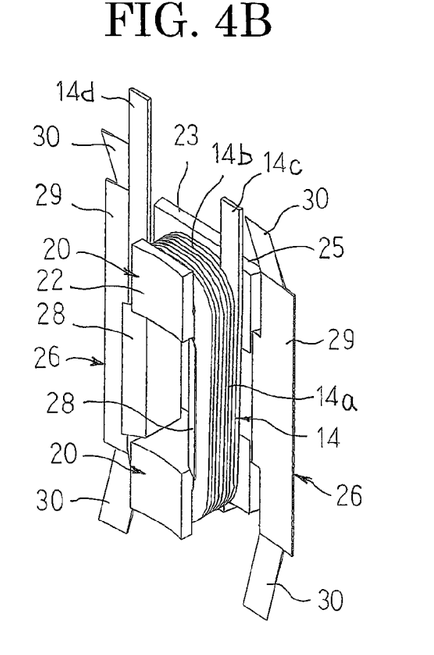
Figure 4C:
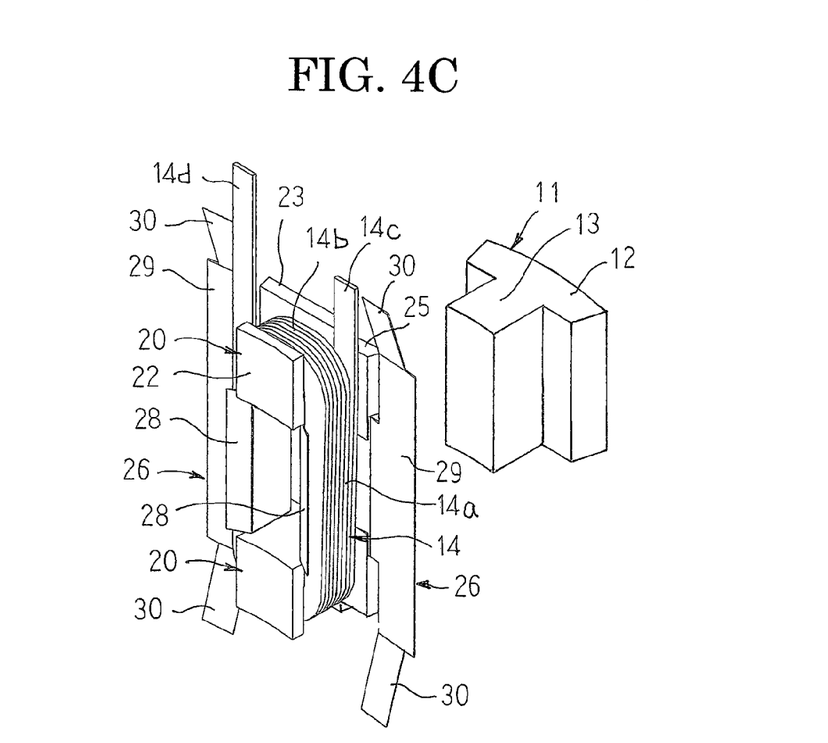
Figure 5A:
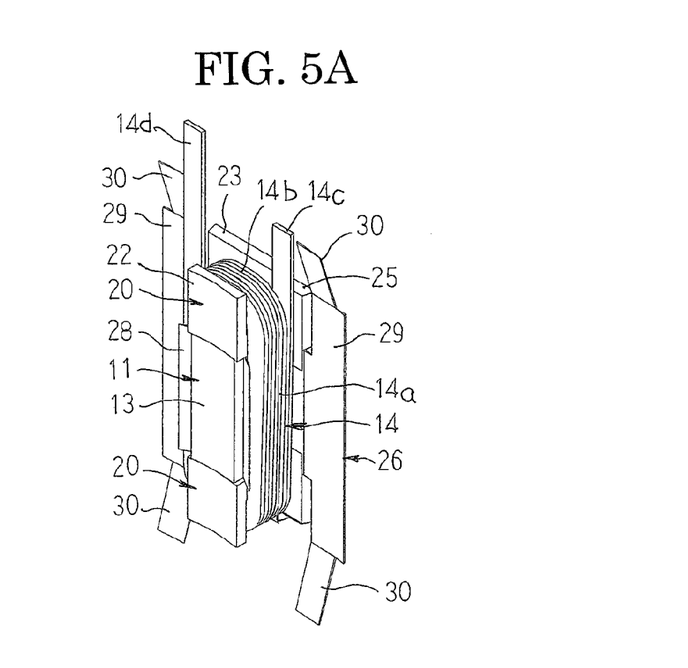
FIGS. 5A and 5B are process perspectives that explain the assembly method for the coil assembly in the automotive electric motor according to Embodiment 1 of the present invention.
Figure 5B:
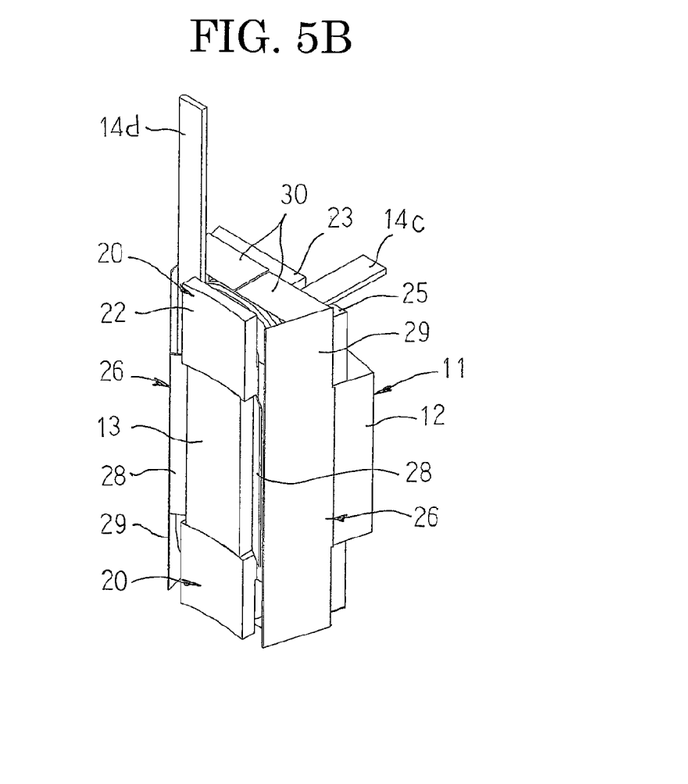

FIG. 1 is a partially cut away end elevation that shows an automotive electric motor according to Embodiment 1 of the present invention, FIG. 2 is a perspective that shows a coil assembly in the automotive electric motor according to Embodiment 1 of the present invention, FIG. 3 is an exploded perspective that explains a configuration of the coil assembly in the automotive electric motor according to Embodiment 1 of the present invention, FIGS. 4A through 4C are process perspectives that explain an assembly method for the coil assembly in the automotive electric motor according to Embodiment 1 of the present invention, and FIGS. 5A and 5B are process perspectives that explain the assembly method for the coil assembly in the automotive electric motor according to Embodiment 1 of the present invention. Moreover, in FIG. 1, the automotive electric motor is shown with a bobbin and insulating sheets omitted for convenience.

In FIGS. 1 and 2, an automotive electric motor 1 that functions as a rotary electric machine includes: a shaft 4 that is rotatably supported by a frame (not shown); a rotor 2 that is fixed to the shaft 4 and that is rotatably disposed inside the frame; a stator 8 that has: an annular stator core 9; and concentrated winding coils 14 that are mounted onto respective teeth 13 of the stator core 9, the stator core 9 being held by the frame, and the stator 8 being disposed so as to surround the rotor 2 so as to have a predetermined gap interposed; and a connecting board 17.

The rotor 2 includes: a rotor core 3 that is formed by laminating and integrating electromagnetic steel plates that have been punched into predetermined shapes, for example; a shaft 4 that is press-fitted into and fixed to a shaft insertion aperture 6 that is formed so as to pass through a central axial position of the rotor core 3; and permanent magnets 5 that are inserted into each of eight magnet insertion apertures 7 that are each formed so as to pass through the rotor core 3, and that are arranged concyclically at a uniform angular pitch.

The stator core 9 is constituted by twelve core segments 11. Specifically, the core segments 11 are formed so as to have shapes that are obtained by dividing the stator core 9 into twelve equal sections circumferentially. The core segments 11, are formed by laminating and integrating a large number of electromagnetic steel plates that have been punched into identical shapes, for example, and have: circular arc-shaped core back portions 12; and teeth 13 that are disposed so as to extend radially inward from circumferential centers of inner circumferential surfaces of core back portions 12.

Coil assemblies 15 include: a pair of bobbins 20 that are disposed on end surfaces of the core segments 11 from two axial ends of the core segments 11; a pair of insulating sheets 26 that are disposed on side surfaces of the core segments 11 from two circumferential sides of the core segments 11; and concentrated winding coils 14 that are wound around the teeth 13 of the core segments 11 and the pair of bobbins 20.

Coil assemblies 15 that are arranged in an annular shape circumferentially by abutting circumferential end surfaces of the core back portions 12 of the core segments 11 to each other are press-fitted into and fixed to an annular ring portion 16 or are inserted inside and fixed to the ring portions 16 by shrinkage fitting to configure the stator 8. Moreover, the core segments 11 are arranged into an annular shape by abutting circumferential end surfaces of the core back portions 12 to each other to configure the stator core 9. The core back portions 12 link circumferentially to configure the core back of the stator core 9, and spaces that are formed by the core back and adjacent teeth 13 constitute slots 10.

The connecting board 17 is constituted by ring-shaped circuit boards in which C-shaped wiring 18N, 18U, 18V, and 18W that has a predetermined width is arranged in four rows radially, and is disposed on an end surface of the core back of the stator core 9. A U-phase terminal 19U, a V-phase terminal 19V, and a W-phase terminal 19W are connected by solder, etc., to the respective wiring 18U, 18V, and 18W.

First leader lines 14c of four concentrated winding coils 14 in every third place are connected by solder, etc., to the wiring 18N, and second leader lines 14d are connected by solder, etc., to the wiring 18U. First leader lines 14c of the next four concentrated winding coils 14 in every third place are connected by solder, etc., to the wiring 18N, and second leader lines 14d are connected by solder, etc., to the wiring 18V. In addition, first leader lines 14c of the remaining four concentrated winding coils 14 in every third place are connected by solder, etc., to the wiring 18N, and second leader lines 14d are connected by solder, etc., to the wiring 18W. The U-phase winding, the V-phase winding, and the W-phase winding are thereby wye-connected to configure a three-phase alternating-current winding. The U-phase winding, the V-phase winding, and the W-phase winding are each configured by connecting four concentrated winding coils 14 in parallel.

An automotive electric motor 1 that is configured in this manner operates as an 8-pole 12-slot three-phase synchronous electric motor.

Next, configuration of a coil assemblies 15 will be explained with reference to FIG. 3.

The concentrated winding coils 14 are configured by winding a conductor wire 32 that has a rectangular cross section into an edgewise winding in a single layer for a predetermined number of turns.

The bobbins 20 are resin-molded bodies in which a polyphenylene sulfide (PPS) resin is used, for example. The bobbins 20 have: a trunk portion 21 in which a cross section that is perpendicular to a longitudinal direction is an approximately rectangular shape in which rounding is applied to two corner portions on an upper portion side, and that is disposed such that the longitudinal direction is oriented in a radial direction of a tooth 13 and a bottom surface is parallel to two axial end surfaces of the tooth 13; a first guide portion 22 that extends away from the bottom surface (away from the teeth 13) from a first longitudinal end of an upper surface of the trunk portion 21; a second guide portion 23 that extends away from the bottom surface from a second longitudinal end of the upper surface of the trunk portion 21 so as to face the first guide portion 22; and thin skirt portions 24 that extend away from the upper surface of the trunk portion 21 from two end portions in a width direction of the trunk portion 21, the first guide portion 22, and the second guide portion 23 for a predetermined length. A step portion 25 into which the winding start end of the conductor wire 32 is inserted is formed on a first width direction side of the second guide portion 23.

Insulating sheets 26 are formed by press-molding a sheet that is formed by sandwiching a polyimide film between meta-aramid fibers, for example. The insulating sheets 26 have: a protective portion 27 that functions as a slot insulating portion that is placed on inner wall surfaces of the core back portions 12 and the teeth 13 of the core segments 11 that define the slots 10; first and second cover portions 28 and 29 that function as an interphase insulating portion that are folded over to cover straight portions 14a of the concentrated winding coil 14; and third cover portions 30 that function as first extended portions that are extended axially outward from the second cover portion 29, and that are folded over to cover coil end portions 14b of the concentrated winding coil 14. Here, directions of projection of the third cover portions 30 from the second cover portions 29 are called "axial" because the third cover portions 30 extend axially outward from the second cover portions 29 when the insulating sheets 26 are mounted to the core segments 11.

Next, a method for assembling the coil assemblies 15 will be explained with reference to FIGS. 4 and 5.

First, as shown in FIG. 4A, the pair of bobbins 20 are mounted onto the concentrated winding coil 14 such that the coil end portions 14b of the concentrated winding coil 14 are housed inside concave spaces that are formed by the trunk portions 21 and the first and second guide portions 22 and 23. Next, as shown in FIG. 4B, the pair of insulating sheets 26 are mounted inside the straight portions 14a of the concentrated winding coil 14 such that the two ends of the protective portions 27 overlap with the skirt portions 24. Then, as shown in FIG. 4C, the tooth 13 of a core segment 11 is inserted into a space that is formed by the trunk portions 21 of the pair of bobbins 20 and the protective portions 27 of the pair of insulating sheets 26.

Thus, as shown in FIG. 5A, the insulating sheets 26 are disposed such that the protective portions 27 are placed on the inner wall surfaces of the core back portion 12 and the tooth 13 that define the slots 10 from two circumferential sides of the core segment 11, and the bobbins 20 are disposed so as to orient the longitudinal direction of the trunk portions 21 in a radial direction of the tooth 13 so as to place the bottom surfaces of the trunk portions 21 alongside the end surfaces of the core segment 11 from two axial ends of the core segment 11. Entire surfaces of the two axial end surfaces of the core segment 11 are covered by the trunk portions 21 of the bobbins 20, and entire surfaces of the inner wall surfaces of the core back portions 12 and the tooth 13 that define the slots 10 are covered by the protective portions 27 of the insulating sheets 26. The third cover portions 30 extend axially outward from the second cover portions 29.

Next, the conductor wire 32 that projects outward from a radially outer end portion of the concentrated winding coil 14, i.e., the first leader line 14c, is bent, and is led radially outward through the step portion 25 that is formed on the second guide portion 23. In addition, the first and second cover portions 28 and 29 of the insulating sheets 26 are folded over so as to cover the straight portions 14a of the concentrated winding coil 14, and the third cover portions 30 of the insulating sheets 26 are folded over so as to cover the coil end portions 14b of the concentrated winding coil 14, to form the state that is shown in FIG. 5B.

Next, the conductor wire 32 that projects outward from a radially inner end portion of the concentrated winding coil 14, i.e., the second leader line 14d, is bent, and is led radially outward over the coil end portion 14b of the concentrated winding coil 14 that is covered by the third cover portions 30 to assemble the coil assembly 15 that is shown in FIG. 2.

According to Embodiment 1, two third cover portions 30 of a pair of insulating sheets 26 that are disposed on two sides of a core segment 11 overlap with each other to cover a coil end portion 14b of a concentrated winding coil 14. Thus, electrical insulators are interposed between a second leader line 14d of the concentrated winding coil 14 and a first turn near a winding start of the concentrated winding coil 14. In addition, air clearance between the second leader line 14d and the third cover portions 30 and creepage distance parallel to surfaces of the stacked third cover portions 30 are ensured. Electrical insulation between the second leader line 14d and the first turn near the winding start of the concentrated winding coil 14 is thereby increased. Thus, it is not necessary to separate the second leader line 14d inordinately from the coil end portion 14b of the concentrated winding coil 14 to be led radially outward parallel to the coil end portion 14b, enabling axial length increases in the stator 8 to be suppressed, thereby enabling reductions in the size of the automotive electric motor 1.

The concentrated winding coil 14 is mounted so as to pass through concave spaces that are formed by the trunk portions 21, the first guide portions 22, and the second guide portions 23 of the bobbins 20 that are disposed at two axial ends of the tooth 13. Thus, radial movement of the concentrated winding coil 14 is restricted by the first guide portion 22 and the second guide portion 23, which are disposed so as to be separated radially. Axial movement of the concentrated winding coil 14 is also restricted by the pair of trunk portions 21, which are disposed so as to be separated axially. Situations in which the concentrated winding coil 14 moves due to vehicle vibration, and is dislodged from the tooth 13, or rubs against the core segment 11 and gives rise to insulation failure, are thereby prevented.

Because the trunk portions 21 and the protective portions 27 are interposed between the concentrated winding coil 14 and the core segment 11, electrical insulation is ensured between the concentrated winding coil 14 and the core segment 11. Because the first and second cover portions 28 and 29 cover the circumferential side surfaces of the straight portions 14a of the concentrated winding coil 14, electrical insulation is also ensured between circumferentially adjacent concentrated winding coils 14.

Moreover, in Embodiment 1 above, third cover portions 30 of a pair of insulating sheets 26 that are disposed on two sides of a core segment 11 are folded over so as to overlap with each other to cover the coil end portions 14b of the concentrated winding coil 14, but the third cover portions 30 of only one insulating sheet 26 that is disposed on one side of the core segment 11 may also be folded over to cover the coil end portions 14b of the concentrated winding coil 14.

Embodiment 2

Figure 6:
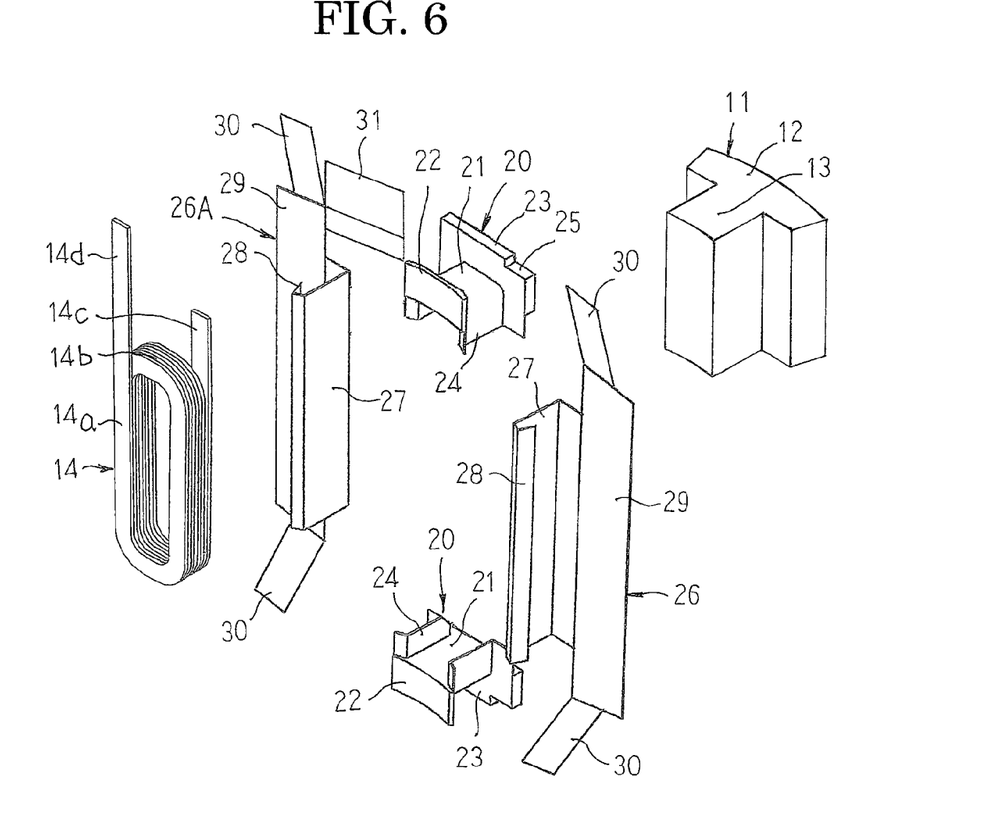
FIG. 6 is an exploded perspective that explains a configuration of a coil assembly in an automotive electric motor according to Embodiment 2 of the present invention.
Figure 7A:
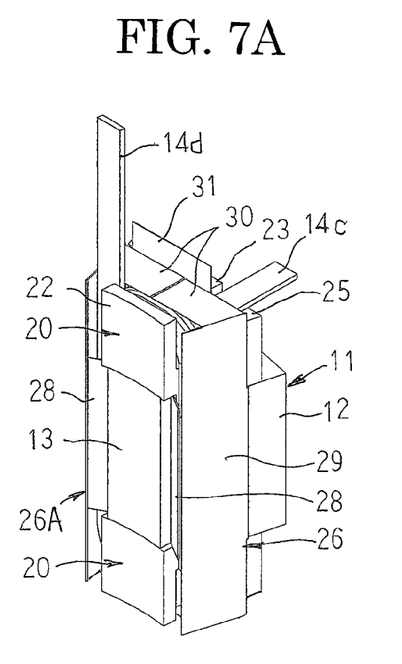
FIGS. 7A through 7C are process perspectives that explain an assembly method for the coil assembly in the automotive electric motor according to Embodiment 2 of the present invention.
Figure 7B:
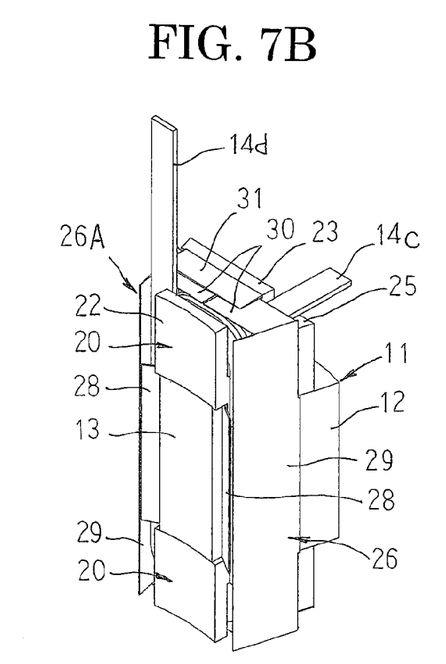
Figure 7C:
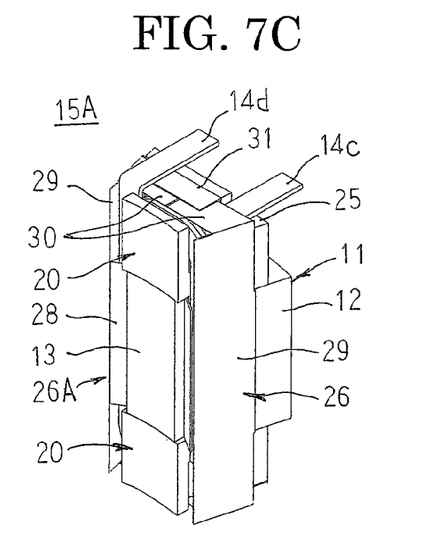

FIG. 6 is an exploded perspective that explains a configuration of a coil assembly in an automotive electric motor according to Embodiment 2 of the present invention, and FIGS. 7A through 7C are process perspectives that explain an assembly method for the coil assembly in the automotive electric motor according to Embodiment 2 of the present invention.

In FIG. 6, a coil assembly 15A is constituted by a core segment 11, a concentrated winding coil 14, a pair of bobbins 20, and insulating sheets 26 and 26A. In addition to a protective portion 27, a first cover portion 28, a second cover portion 29, and a third cover portion 30, the insulating sheet 26A has: a fourth cover portion 31 that functions as a second extended portion that is extended circumferentially from the second cover portion 29, and that is folded over so as to overlap with the third cover portion to cover a coil end portion 14b of a concentrated winding coil 14. Here, a direction of projection of the fourth cover portion 31 from the second cover portion 29 is called "circumferential" because the fourth cover portion 31 extends outward circumferentially from the second cover portion 29 when the insulating sheet 26A is mounted to the core segment 11.

Moreover, the rest of the configuration is configured in a similar manner to Embodiment 1 above.

Next, a method for assembling the coil assembly 15A will be explained with reference to FIGS. 7A through 7C.

First, the pair of bobbins 20 and the insulating sheet 26 and 26A are mounted onto the concentrated winding coil 14 in a similar manner to Embodiment 1 above. Here, the fourth cover portion 31 is disposed so as to extend circumferentially from the second cover portion 29 and lie alongside an inner wall surface of the second guide portion 23. Then, the tooth 13 of a core segment 11 is inserted into a space that is formed by the trunk portions 21 of the pair of bobbins 20 and the protective portions 27 of the insulating sheets 26 and 26A. Next, the first leader line 14c, which projects outward from a radially outer end portion of the concentrated winding coil 14, is bent, and is led radially outward from the step portion 25 that is formed on the second guide portion 23, the first and second cover portions 28 and 29 of the insulating sheets 26 and 26A are folded over so as to cover the straight portions 14a of the concentrated winding coil 14, and the third cover portions 30 of the insulating sheets 26 and 26A are folded over so as to cover the coil end portions 14b of the concentrated winding coil 14, to form the state that is shown in FIG. 7A.

Next, as shown in FIG. 7B, the fourth cover portion 31 of the insulating sheet 26A is folded over so as to overlap with the third cover portions 30. In addition, the second leader line 14d, which projects outward from a radially inner end portion of the concentrated winding coil 14, is bent, and is led radially outward over the coil end portion 14b of the concentrated winding coil 14 that is covered by the third and fourth cover portions 30 and 31 to assemble the coil assembly 15A that is shown in FIG. 7C.

According to Embodiment 2, because three cover portions, i.e., third cover portions 30 of insulating sheets 26 and 26A and a fourth cover portion 31 of an insulating sheet 26A, overlap with each other to cover a coil end portion 14b of a concentrated winding coil 14, electrical insulation between a second leader line 14d of the concentrated winding coil 14 and a first turn near a winding start of the concentrated winding coil 14 is reliably ensured. Thus, the second leader line 14d can be led radially outward over the coil end portion 14b closer to the coil end portion 14b of the concentrated winding coil 14, enabling further reductions in the size of the automotive electric motor.

In Embodiment 2, because the concentrated winding coil 14 is also mounted so as to pass through concave spaces that are formed by the trunk portions 21, the first guide portions 22, and the second guide portions 23 of the bobbins 20 that are disposed at two axial ends of the tooth 13, situations in which the concentrated winding coil 14 moves due to vehicle vibration, and is dislodged from the tooth 13, or rubs against the core segment 11 and gives rise to insulation failure, are thereby prevented. Because the trunk portions 21 and the protective portions 27 are interposed between the concentrated winding coil 14 and the core segment 11, electrical insulation is ensured between the concentrated winding coil 14 and the core segment 11. Because the first and second cover portions 28 and 29 cover the circumferential side surfaces of the straight portions 14a of the concentrated winding coil 14, electrical insulation is also ensured between circumferentially adjacent concentrated winding coils 14.

Moreover, in Embodiment 2 above, the coil end portion is covered by stacking three cover portions, i.e., the two third cover portions and the fourth cover portion, but the coil end portion may also be covered by stacking two cover portions, i.e., one of the third cover portions and the fourth cover portion, or the coil end portion may also be covered using only the fourth cover portion.

In each of the above embodiments, explanations are given for automotive electric motors, but the present invention is not limited to automotive electric motors, and can be applied to rotary electric machines such as automotive alternators, automotive generator-motors, etc., and is also not limited to automotive use.

In each of the above embodiments, a ratio between a magnetic pole count and a slot count in the automotive electric motors is 8:12, i.e., a pole-to-slot ratio is 2:3, but the pole-to-slot ratio is not limited to 2:3, and may also be 4:3, for example.

In each of the above embodiments, a stator core is configured so as to be divided into a plurality of core segments, but it is not absolutely necessary for the stator core to be configured so as to be divided into a plurality of core segments provided that a concentrated winding coil of edgewise windings can be wound onto the teeth, and a core group that is configured by linking together outer circumferential portions of circumferential end surfaces of core back portions of core segments using bendable linking portions may also be used, for example.

In each of the above embodiments, the stator core and the rotor core are formed by laminating and integrating electromagnetic steel plates, but the materials of the stator core and the rotor core are not limited to electromagnetic steel plates, and need only be magnetic steel plates.

In each of the above embodiments, the stator core and the rotor core are laminated cores that are formed by laminating and integrating electromagnetic steel plates, but the stator core and the rotor core are not limited to laminated cores, and may also be pressed powder cores, for example.

What is claimed is:

1. A rotary electric machine comprising:
  a rotor;
  a stator comprising:
    an annular stator core; and
    concentrated winding coils that are configured by winding conductor wires that have a rectangular cross section into edgewise windings on respective teeth of said stator core, said stator being disposed so as to surround said rotor; bobbins comprising:
    a trunk portion; and
    a pair of guide portions that are disposed so as to protrude from two longitudinal ends of an upper surface of said trunk portion,
  said bobbins being disposed such that longitudinal directions of said respective trunk portion are oriented in a radial direction of said teeth, and so as to place bottom surfaces of said trunk portions alongside two axial end surfaces of said teeth;
  an insulating sheet comprising:
    slot insulating portions that are disposed on first and second circumferential sides of each of said teeth of said stator core, and that are interposed between inner wall surfaces of slots of said stator core and straight portions of said concentrated winding coils to insulate between said stator core and said straight portions; and interphase insulating portions that are disposed on first and second circumferential sides of each of said teeth of said stator core, and that cover said straight portions to insulate between said straight portions in adjacent concentrated winding coils, wherein:

said concentrated winding coils are mounted onto each of said teeth such that a coil end portion is housed inside a concave space that is formed by said trunk portion and said pair of guide portions at two axial ends of said teeth;

a portion of said insulating sheet extends so as to cover said coil end portion;

a first leader line that projects outward from a radially outer end portion of said concentrated winding coil is bent and led radially outward; and a second leader line that projects outward from a radially inner end portion of said concentrated winding coil is bent and led radially outward parallel to said coil end portion that is covered by said portion of said insulating sheet; and a first extended portion that is extended axially outward from said interphase insulating portion of said insulating sheet that is disposed on said first circumferential side of said teeth is folded and extended so as to cover said coil end portion; and a second extended portion that is extended circumferentially outward from one of said interphase insulating portions of said insulating sheet that are disposed on said first and second circumferential sides of said teeth is folded so as to overlap with said first extended portion and extended so as to cover said coil end portion.

2. A rotary electric machine comprising:

a rotor;

a stator comprising:

an annular stator core; and concentrated winding coils that are configured by winding conductor wires that have a rectangular cross section into edgewise windings on respective teeth of said stator core, said stator being disposed so as to surround said rotor; bobbins comprising:

a trunk portion; and a pair of guide portions that are disposed so as to protrude from two longitudinal ends of an upper surface of said trunk portion, said bobbins being disposed such that longitudinal directions of said respective trunk portion are oriented in a radial direction of said teeth, and so as to place bottom surfaces of said trunk portions alongside two axial end surfaces of said teeth;

an insulating sheet comprising:

slot insulating portions that are disposed on first and second circumferential sides of each of said teeth of said stator core, and that are interposed between inner wall surfaces of slots of said stator core and straight portions of said concentrated winding coils to insulate between said stator core and said straight portions; and interphase insulating portions that are disposed on first and second circumferential sides of each of said teeth of said stator core, and that cover said straight portions to insulate between said straight portions in adjacent concentrated winding coils, wherein:

said concentrated winding coils are mounted onto each of said teeth such that a coil end portion is housed inside a concave space that is formed by said trunk portion and said pair of guide portions at two axial ends of said teeth;

a portion of said insulating sheet extends so as to cover said coil end portion;

a first leader line that projects outward from a radially outer end portion of said concentrated winding coil is bent and led radially outward; and a second leader line that projects outward from a radially inner end portion of said concentrated winding coil is bent and led radially outward parallel to said coil end portion that is covered by said portion of said insulating sheet; and first extended portions that are extended axially outward from said interphase insulating portions of said insulating sheet that are disposed on said first and second circumferential sides of said teeth are folded so as to overlap with each other and extended so as to cover said coil end portion; and a second extended portion that is extended circumferentially outward from one of said interphase insulating portions of said insulating sheet that are disposed on said first and second circumferential sides of said teeth is folded so as to overlap with said first extended portion and extended so as to cover said coil end portion.

3. A rotary electric machine comprising:

a rotor;

a stator comprising:

an annular stator core; and concentrated winding coils that are configured by winding conductor wires that have a rectangular cross section into edgewise windings on respective teeth of said stator core, said stator being disposed so as to surround said rotor; bobbins comprising:

a trunk portion; and a pair of guide portions that are disposed so as to protrude from two longitudinal ends of an upper surface of said trunk portion, said bobbins being disposed such that longitudinal directions of said respective trunk portion are oriented in a radial direction of said teeth, and so as to place bottom surfaces of said trunk portions alongside two axial end surfaces of said teeth;

an insulating sheet comprising:

slot insulating portions that are disposed on first and second circumferential sides of each of said teeth of said stator core, and that are interposed between inner wall surfaces of slots of said stator core and straight portions of said concentrated winding coils to insulate between said stator core and said straight portions; and interphase insulating portions that are disposed on first and second circumferential sides of each of said teeth of said stator core, and that cover said straight portions to insulate between said straight portions in adjacent concentrated winding coils, wherein:

said concentrated winding coils are mounted onto each of said teeth such that a coil end portion is housed inside a concave space that is formed by said trunk portion and said pair of guide portions at two axial ends of said teeth;
a portion of said insulating sheet extends so as to cover said coil end portion;
a first leader line that projects outward from a radially outer end portion of said concentrated winding coil is bent and led radially outward; and
a second leader line that projects outward from a radially inner end portion of said concentrated winding coil is bent and led radially outward parallel to said coil end portion that is covered by said portion of said insulating sheet; and
a second extended portion that is extended circumferentially outward from one of said interphase insulating portions of said insulating sheet that are disposed on said first and second circumferential sides of said teeth is folded so as to overlap with said first extended portion and extended so as to cover said coil end portion.

* * * * *